Nov. 22, 1960

E. P. WIGNER 2,961,392

NEUTRONIC REACTORS

Filed Aug. 28, 1945

Witnesses:
Herbert E. Metcalf
Walter L. Schlegel, Jr.

Inventor:
Eugene P. Wigner
By Robert A. ———
Attorney

Nov. 22, 1960  E. P. WIGNER  2,961,392
NEUTRONIC REACTORS
Filed Aug. 28, 1945  3 Sheets-Sheet 3

Witnesses:
Herbert E. Metcalf
Walter L. Schlegel, Jr.

Inventor:
Eugene P. Wigner
By: Robert A. [Saunders]
Attorney

United States Patent Office 2,961,392
Patented Nov. 22, 1960

2,961,392
NEUTRONIC REACTORS

Eugene P. Wigner, Chicago, Ill., assignor to the United States of America as represented by the United States Atomic Energy Commission Filed Aug. 28, 1945, Ser. No. 613,155

1 Claim. (Cl. 204—193.2)

This invention relates to the general subject of nuclear fission and more particularly to a novel method and means for slowing neutrons to low energies at which they are most effective to produce nuclear fission of neutron fissionable isotopes such as $U^{233}$, $U^{235}$ or $94^{239}$, or mixtures thereof.

In the disclosed embodiments, the invention finds application in a neutronic reactor adapted to sustain a nuclear fission chain reaction. In such reactors a neutron fissionable isotope such as above mentioned is subjected to fission by absorption of neutrons and a self-sustaining chain reaction is established by the neutrons evolved by the fission. In general such reactors comprise bodies of compositions containing such fissionable material, for example natural uranium, disposed in a neutron slowing material which slows the neutrons to thermal energies. Such a slowing material is termed a neutron moderator. Carbon, beryllium and heavy water ($D_2O$) are typical moderators suitable for such use as hereinafter discussed. Heat is evolved during the reaction which is removed by passage of a coolant through the reactor or in heat exchange relationship therewith. Specific details of the theory and essential characteristics of such reactors are set forth in co-pending application of Enrico Fermi and Leo Szilard, Serial No. 568,904, filed December 19, 1944, now Patent Number 2,708,656, issued May 17, 1955.

Most of the neutrons arising from the fission process are set free with the very high energy of above one million electron volts average and are therefore not in condition to be utilized efficiently to create new thermal neutron fissions in a fissionable body such as $U^{235}$ when it is mixed with a considerable quantity of $U^{238}$, particularly as in the case of natural uranium. The energies of the fission-released neutrons are so high that most of the latter would tend to be absorbed by the $U^{238}$ nuclei, and yet the energies are not generally high enough for production of fission by more than a small fraction of the neutrons so absorbed. For neutrons of thermal energies, however, the absorption cross-section of $U^{235}$, to produce fission, is a great deal more than the simple capture cross-section of $U^{238}$, so that under the stated circumstances the fast fission neutrons, after they are created, must be slowed down to thermal energies before they are most effective to produce fresh fission by reaction with additional $U^{235}$ atoms. If a system can be made in which neutrons are slowed down without excessive absorption until they reach thermal energies and then mostly enter into uranium rather than into any other element, a self-sustaining nuclear chain reaction can be obtained, even with natural uranium. Light elements, such as deuterium, beryllium, oxygen or carbon, the latter in the form of graphite, can be used as slowing agents. A special advantage of the use of the light elements mentioned for slowing down fast fission neutrons is that fewer collisions are required for slowing than is the case with heavier elements, and furthermore, the above-enumerated elements have very small neutron capture probabilities, even for thermal neutrons. Hydrogen would be most advantageous were it not for the fact that there may be a relatively high probability of neutron capture by the hydrogen nucleus. Carbon, in the form of graphite, is a relatively inexpensive, practical, and readily available agent for slowing fast neutrons to thermal energies. Recently, beryllium has been made available in sufficiently large quantities for test as to suitability for use as a neutron slowing material in a system of the type to be described. It has been found to be in every way as satisfactory as carbon. Deuterium while more expensive is especially valuable because of its low absorption of neutrons, and its compounds, such as heavy water or deuterium oxide, have been used with very effective results.

However, in order for the premise to be fulfilled that the fast fission neutrons be slowed to thermal energies in a slowing medium without too large an absorption in the $U^{238}$ isotope of the uranium, certain types of physical structure should be utilized for the most efficient reproduction of neutrons, since unless precautions are taken to reduce various neutron losses and thus to conserve neutrons for the chain reaction, the rate of neutron reproduction may be lowered and in certain cases lowered to a degree such that a self-sustaining system is not attained.

An initial number of fast neutrons in the system by going through the process of absorption and fission produce in the next generation a number of neutrons generally different from the initial number. The ratio of the number produced after one generation of the initial number for a system of infinite size is called the reproduction or multiplication factor of the system and is denoted by the symbol K. If K can be made sufficiently greater than unity to create a net gain in neutrons and the system made sufficiently large so that this gain is not entirely lost by leakage from the exterior surface of the system, then a self-sustaining chain reacting system can be built to produce power by nuclear fission of natural uranium. The neutron reproduction ratio $r$ in a system of finite size differs from K by the leakage factor, and must be sufficiently greater than unity to permit the neutron density to rise exponentially. Such a rise will continue indefinitely if not controlled at a desired density corresponding to a desired power output.

Heavy water, as noted above, is one of the best known moderator materials; however, due to the fact that it is a liquid it lacks definite form and strength. For this reason amorphous carbon, in the form of graphite, has been found to be more useful than heavy water under certain conditions despite the fact that the neutron capture cross-section of graphite is somewhat larger than that of heavy water. For example, in a pile or reactor wherein the fissionable material is in the form of horizontal rods suspended within the moderator, graphite has been found to be an excellent moderator material inasmuch as it affords support for the rods, thereby eliminating the use of special hangars which would tend to absorb neutrons, and would therefore result in a loss of K.

In a so-called homogeneous reactor wherein the fissionable material is in the form of particles suspended in heavy water to form a colloid or slurry, it appears that colloidal graphite in the slurry functions not only as a neutron moderator but also as a lubricant for pumps and other apparatus through which the slurry is circulated during operation of the system. Furthermore, it is believed that the graphite particles in the slurry tend to adhere to the particles of fissionable material therein, thereby preventing the latter from leaking on various parts of the equipment, a phenomenon which has heretofore been a major problem in reactors of this type.

Therefore, an object of the present invention is to provide a novel neutron moderator composed of porous material impregnated or soaked with a liquid moderator, such as heavy water, to obtain the advantages of both.

Another object is to provide a novel neutron moderator construction employing solid and liquid moderator material in which the solid moderator portion supports the fissionable material.

Another object is to provide a novel homogeneous neutronic reactor including both liquid and solid particle moderator.

Another object is to provide a novel reflector for neutronic reactors in which a solid neutron scattering or reflecting material is impregnated or soaked with a fluid neutron scattering or reflecting material.

Other objects and advantages are apparent from the following description taken with the accompanying drawings, in which.

Figure 1:
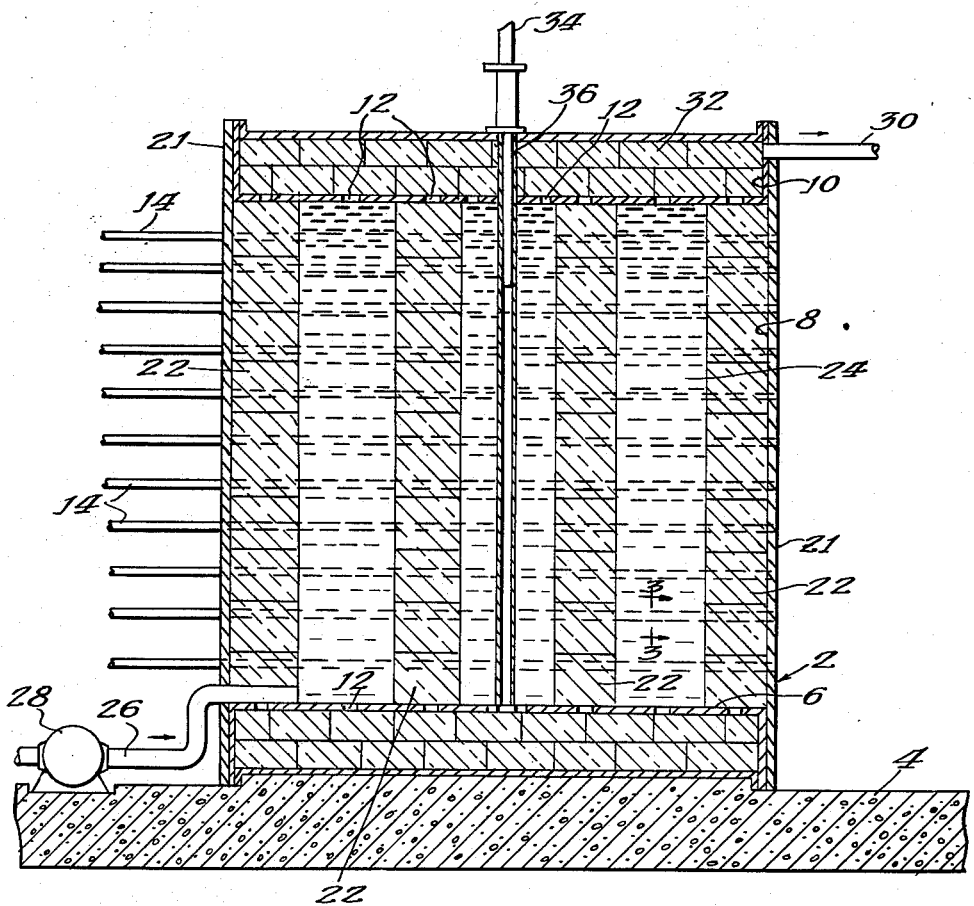
Fig. 1 is a sectional view through a reactor embodying the invention taken in a vertical plane substantially bisecting the reactor on its longitudinal axis.
Figure 3:
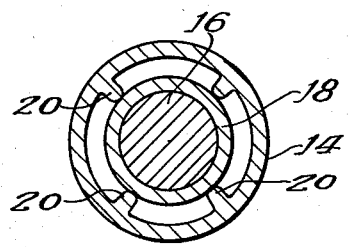
Fig. 3 is a sectional view taken on the transverse vertical plane indicated by the line 3—3 of Fig. 1.
Figure 2:
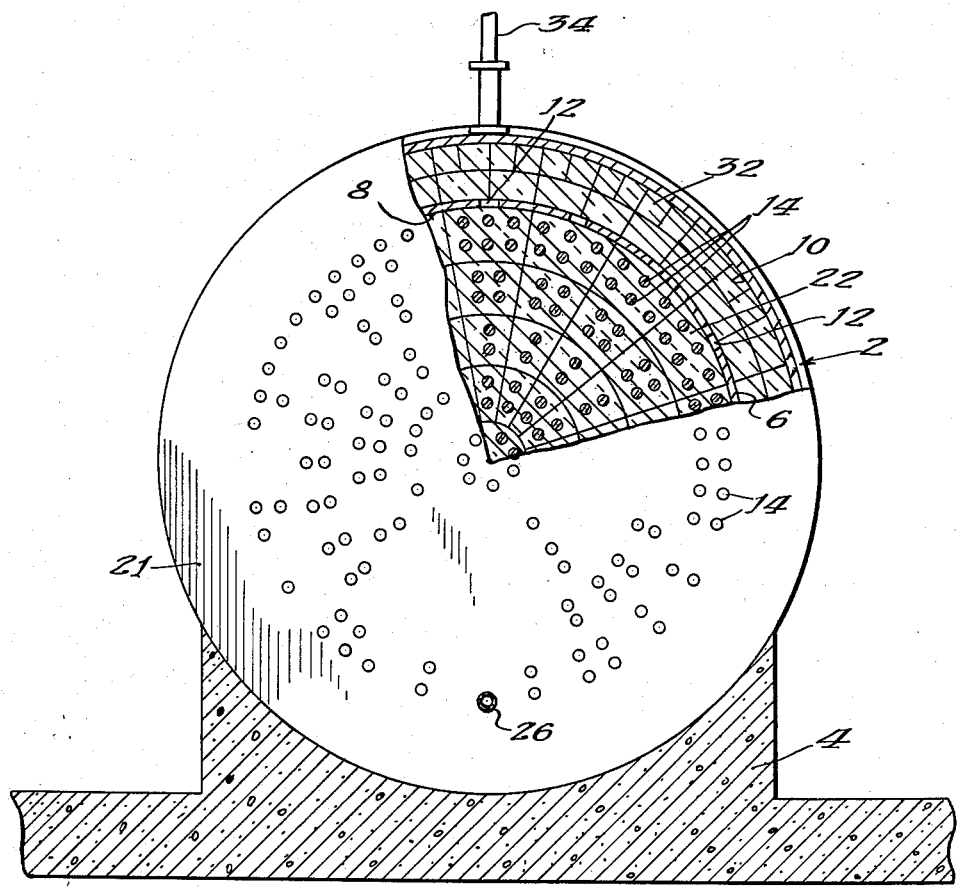
Fig. 2 is an end elevation of the reactor with parts thereof shown in section.

Describing the invention in detail, and referring first to the embodiment illustrated in Figs. 1 to 3, a reactor tank 2 is preferably formed of a material having the characteristic of low neutron absorption such as aluminum, and the tank is supported on a concrete foundation 4 forming part of a vault or chamber (not shown) adapted to contain one or more shields of material such as lead, iron, and ordinary water capable of absorbing emanations from the reactor. The tank 2 is illustrated as cylindrical in form although it will be understood that if desired, the tank may be of any other suitable shape such as cubical or spherical.

Within the tank 2 is a cylindrical aluminum partition or wall 6 dividing the tank 2 into inner and outer chambers 8 and 10, respectively, said chambers being connected by ports or openings 12, 12 through said partition.

The inner chamber 8 contains horizontal rods of uranium-containing material carried within tubes 14, one of said rods being shown at 16 (Fig. 3). In the illustrated embodiment, only a few of the tubes 14 and associated rods are shown. However, in actual practice approximately 460 rods, which are preferably formed of uranium metal, are arranged in a square geometry with the rods spaced 4 inches apart from center to center, each rod being 2 cm. in diameter and 7 feet long. Each rod 16 is disposed within an aluminum sheath 18 (Fig. 3) to prevent cooling water, which passes through the associated tube 14 from attacking the uranium. The sheath 18 is about one-half of a millimeter in thickness, and the water annulus around the rod is about 2.2 millimeters in thickness. The tube 14 is about 3 millimeters in thickness, and is provided with internal ribs 20 (Fig. 3) extending longitudinally thereof and adapted to position the rod centrally of the tube 14 so as to provide the before-mentioned annulus of cooling water around the rod. It will be understood that the cooling water is circulated through the tubes 14 by any conventional means (not shown).

The tubes 14 extend through the end walls 21 of the tank 2 and are supported intermediate said walls by piers or walls 22 of porous moderator material, such as graphite, within the tank 2, said walls being preferably formed of graphite blocks. The walls 22 are impregnated or soaked by a body of heavy water 24 (Fig. 1) which is forced under pressure into the tank 2 through one or more inlet lines 26 equipped with conventional pump means 28; and the heavy water, as well as oxygen and deuterium accumulated therein as decomposition products thereof, is continuously forced from one or more outlet pipes 30 to means (not shown) for recombining the oxygen and deuterium and then condensing the same to liquid heavy water which is conveyed to the suction side of the before mentioned pump means 28.

It will be understood that more or less graphite moderator may be employed within the reactor chamber 8, and if desired, the entire chamber may be filled with graphite saturated with heavy water, the wall 6 being omitted in the latter case.

The outer chamber 10 of the tank 2 is filled with a neutron reflector 32 adapted to reduce neutron losses from the periphery of the reactor by reflecting escaping neutrons back into the reactor. The reflector 32 is preferably composed of porous graphite blocks such as those above described, and the blocks are saturated or soaked with the heavy water circulating through the tank 2. It may be noted that by employing this type of reflector, the characteristic of relatively great rigidity is imparted to the reactor structure, inasmuch as the graphite has definite form and strength unlike heavy water. Where practical, the wall 6 is omitted to eliminate neutron absorption by such metal structure.

It will be understood that the construction above described is more economical than one employing a moderator and reflector composed solely of heavy water inasmuch as the latter is relatively expensive, and thus the amount of heavy water displaced by the graphite represents a substantial economy. Furthermore, as discussed above, the structural properties of the reactor are improved by the graphite which has definite form and strength, and thus affords support for the tubes 14, and increases the rigidity of the entire structure while at the same time not lowering the reproduction materially which would result were metal supports provided for the rods.

Neutron density within the reactor is controlled by a rod 34 of highly neutron absorbent material such as cadmium, said rod being reciprocable within a tube or well 36 extending through the center of the reactor.

Figure 4:
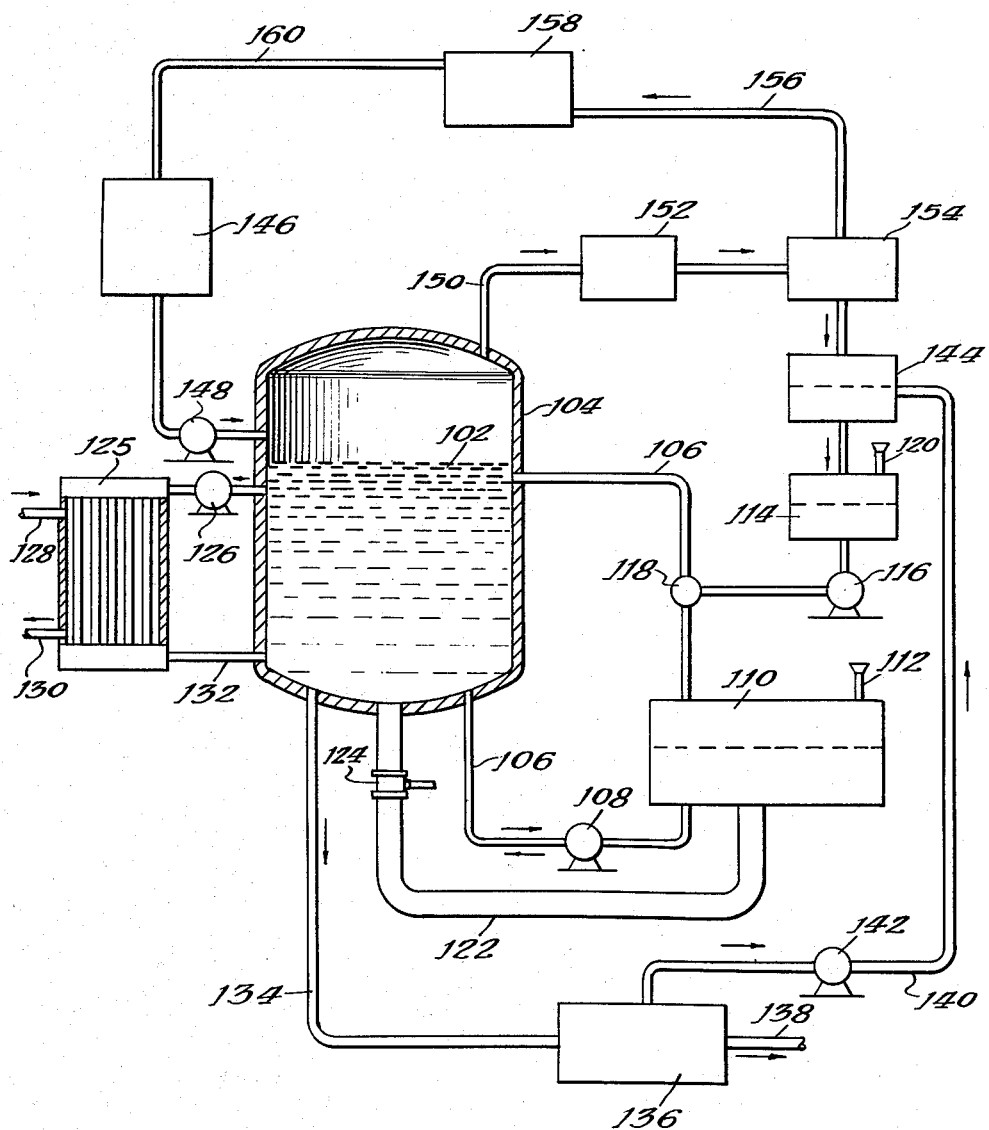
Fig. 4 is a flow diagram illustrating the invention as applied to a homogeneous slurry reactor.

Referring now to Fig. 4, the reactor illustrated therein is in the form of a body of colloid or slurry 102 which is circulated through a tank or chamber 104 by a system hereinafter described. The slurry is composed of a liquid moderator such as heavy water with colloidal particles of graphite moderator and uranium-containing material suspended therein. The uranium-containing particles may be formed of uranium carbide or uranium oxide, such as $UO_2$, $UO_3$ or $U_3O_8$, and are ground to colloidal size. The graphite particles are also of colloidal size and may be somewhat larger inasmuch as they are lighter than the uranium-containing particles.

The volume of slurry within the tank 104, as well as the concentration of solid particles within the heavy water, is controlled by a circulating system comprising a pipe line 106 including a reversible delivery pump 108. The line 106 is connected to a slurry reservoir 110 having an inlet 112 for the reception of the before mentioned colloidal particles of graphite and uranium-containing material. Heavy water is forced into the line 106 from a heavy water reservoir 114 by means of a pump 116, the suction side of which is connected to the reservoir 114 and the discharge side of which is connected to the line 106 through a three way operating valve 118. The heavy water reservoir 114 is connected to an inlet pipe 120 for the introduction of heavy water when necessary.

The lower extremity of the tank 104 is connected to an emergency dump line 122 through a dump valve 124, said line being connected to the slurry reservoir 110. It will be understood that by opening the valve 124 under emergency conditions, a sufficient quantity of the slurry 102 is dumped into the reservoir 110 to reduce the body of slurry 102 within the tank 104 to a size less than that at which a chain reaction may be sustained.

The slurry 102 is circulated through a heat exchanger 125 by means of a pump 126 having its suction side connected to the heat exchanger. The slurry passes through the heat exchanger in heat exchange relationship with a coolant circulated therethrough by means of inlet and outlet pipes 128 and 130, and the cooled slurry is conveyed back into the tank 104 through the return line 142.

The slurry is also continuously withdrawn from the bottom of the tank 104 through an outlet line 134 connected to a conventional device 136 for separating the heavy water from the particles suspended therein. The separated particles are conveyed from the device 136 through a pipe 138 in order that the uranium-containing particles may be treated by means (not shown) for recovering plutonium and fission products resulting from the reaction within the tank 104. The heavy water is pumped from the device 136 through a line 140 including a pump 142 into a purification tank 144 from which the purified heavy water is conveyed into the before mentioned reservoir tank 114.

As a result of the reaction within the tank 104, the heavy water therein is constantly decomposed into deuterium and oxygen, and means is provided for sweeping these gases from the tank 104 and recombining them. This is accomplished by a circulating system including a helium reservoir 146 connected to the suction side of a pump 148, the discharge side of which is connected to the tank 104 at a point above the body of slurry 102 therein. The helium sweeps oxygen and deuterium in the upper extremity of the tank 104 outwardly therefrom through an outlet line 150 which is connected to a conventional device 152 for recombining the deuterium and oxygen into gaseous heavy water which then passes into a condenser 154 from which the condensed heavy water is conducted to the before mentioned purification tank 144, the purified heavy water passing from the tank 144 into the before mentioned heavy water reservoir 114. The helium is conveyed from the condenser 154 through a line 156 into a purification chamber 158, and thence through a line 160 into the before mentioned helium reservoir 146. Thus, a closed helium circulating system is provided for continuously sweeping oxygen and deuterium from the tank 104.

It will be understood that the particular system illustrated in Fig. 4 is no part of the present invention except for the composition of the slurry 102 which comprises a moderator consisting of colloidal graphite particles impregnated or soaked with heavy water, said particles being effective to lubricate the pumps 108 and 126 and the valves 118 and 124. The particles of graphite are also believed to be effective in preventing caking of the uranium-containing particles on various parts of the equipment as heretofore discussed.

While the theory of the nuclear chain fission mechanism in uranium set forth herein is based on the best presently known experimental evidence, it is not desired to be bound thereby, as additional experimental data later discovered may modify the theory disclosed. Any such modification of theory, however, will in no way effect the results to be obtained in the practice of the invention herein described and claimed.

Obviously, many modifications may be made in the specific embodiments disclosed without departing from the intended scope of the invention.

What is claimed is:

In a neutronic reactor of the type comprising a body of moderator having horizontal rods of thermal neutron fissionable material extending therethrough of a size and disposition to produce a chain reaction, the improved construction wherein the moderator body comprises a body of heavy water disposed in a tank and spaced parallel walls of graphite supported on the floor of the tank and extending transversely of the rods, said rods extending through said walls and being supported thereby.

References Cited in the file of this patent

UNITED STATES PATENTS

| 2,206,634 | Fermi | July 2, 1940 |
| 2,708,656 | Fermi | May 17, 1955 |

FOREIGN PATENTS

| 114,150 | Australia | May 2, 1940 |
| 114,151 | Australia | May 3, 1940 |
| 861,390 | France | Oct. 28, 1940 |
| 233,011 | Switzerland | Oct. 2, 1944 |
| 233,278 | Switzerland | Oct. 16, 1944 |

OTHER REFERENCES

Hackh's Chemical Dictionary, pages 78 and 238, Blakiston (1937), Copy in Patent Office Library.

Kelly et al.: Phy. Rev. 73, 1135–9 (1948). Copy in Patent Office Library.